United States Patent [19]
Portis et al.

[11] Patent Number: 5,257,771
[45] Date of Patent: Nov. 2, 1993

[54] POWERED ACTUATOR FOR VALVE

[75] Inventors: Ralph G. Portis, Highland Park; Robert H. Dean, Evanston, both of Ill.

[73] Assignee: Midland Manufacturing Corp., Skokie, Ill.

[21] Appl. No.: 12,935

[22] Filed: Feb. 17, 1993

[51] Int. Cl.⁵ .............................. F16K 31/14
[52] U.S. Cl. ................................ 251/293; 251/59; 251/292
[58] Field of Search .......... 251/292, 293, 59, 291

[56] References Cited
U.S. PATENT DOCUMENTS

| | | | |
|---|---|---|---|
| 702,342 | 6/1902 | Clough | 251/293 X |
| 1,410,846 | 3/1922 | Stewart . | |
| 4,131,133 | 12/1978 | Huwe | 251/292 X |
| 4,629,157 | 12/1986 | Tsuchiya et al. | 251/292 |
| 4,633,897 | 1/1987 | Effenberger | 251/292 |
| 4,637,423 | 1/1987 | Gray | 251/292 |
| 4,714,233 | 12/1987 | Oates . | |
| 4,834,137 | 5/1989 | Kawaguchi et al. . | |
| 4,872,482 | 10/1989 | Jarrett . | |
| 4,953,586 | 9/1990 | Weyer | 251/292 X |

Primary Examiner—Stephen M. Hepperle
Attorney, Agent, or Firm—Emrich & Dithmar

[57] ABSTRACT

Coupling apparatus includes a bracket fixed to the housing of an air motor and an actuator member fixed to the rotary output shaft of the air motor for coupling the air motor in driving engagement with a handwheel-operated valve for remote power actuation thereof. The apparatus is freely movable into and out of coupling engagement with the valve in directions axially of the valve stem without the use of tools, the actuator legs being movable into rotating engagement with the handwheel for rotation thereof simultaneously with movement of the bracket into non-rotatable engagement with the valve body for anchoring the motor housing and preventing rotation thereof with its output shaft. Two embodiments are disclosed, one for use with a valve having a solid handwheel and a yoke and the other for use with a valve having a spoked handwheel and no yoke.

20 Claims, 2 Drawing Sheets

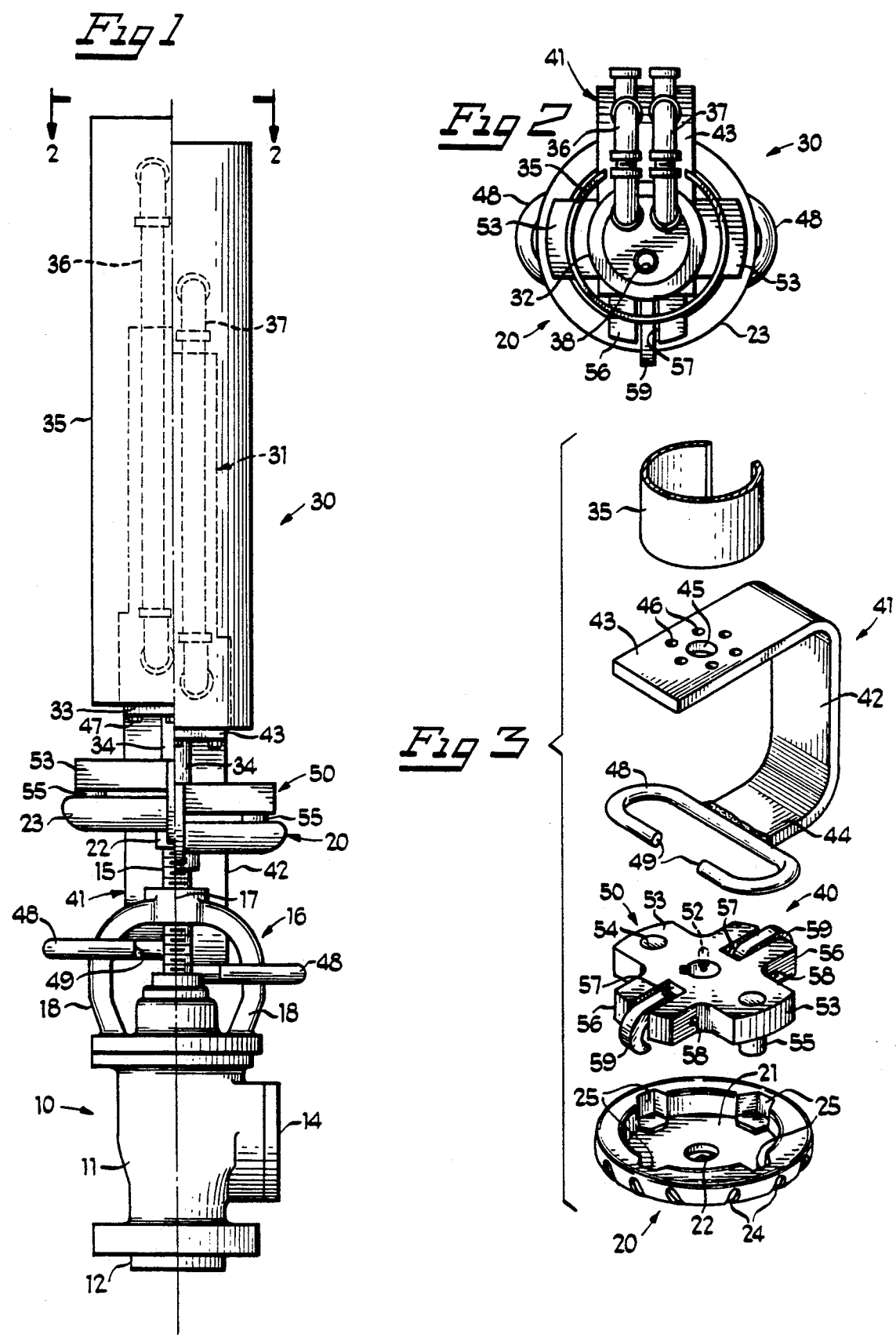

POWERED ACTUATOR FOR VALVE

BACKGROUND OF THE INVENTION

1. Field of the Invention

The present invention relates to powered valve actuators for remotely-controlled operation of valves and, more particularly, to actuators for handwheel-operated valves.

2. Description of the Prior Art

Fluids under pressure are often stored or transported in a vessel having a valve at its top which is operated by a rotating valve stem to open and close the valve. For vessels which contain fluids which are corrosive, toxic or otherwise dangerous to the operator of the valve, manual operation of the valve is undesirable, since it can be dangerous to the operator if the valve leaks or otherwise permits the escape of the fluid. Accordingly, powered controllers or actuators for such valves have been provided which can be operated from a remote location. In certain types of vessels, such as cargo tanks for railway cars, trucks or the like, the valve stem may be provided with a handwheel for manual rotation. In this case, the actuator must engage the handwheel to effect rotation thereof.

Powered actuators typically include a motor which has a housing and a rotating output shaft which is coupled to the handwheel or operating element for the valve stem to effect rotation thereof. In such powered actuators, it is also necessary to provide a coupling between the motor and the valve so that the torque generated by the motor output shaft does not cause displacement between the motor housing and the valve body. It is also necessary to prevent separation occurring between the valve and the actuator. Therefore, prior actuators have typically provided a means for fixedly securing the actuator to the valve body. This may require the use of a tool, such as a wrench or the like, and also requires the presence of personnel at the valve site to affix the actuator to the valve and to disconnect it when the valve actuation has been completed.

Many vessels are provided with different sizes and types of valves which may have quite different housing and/or handwheel constructions. Thus, the structure for coupling an actuator to one valve may not be suitable for coupling it to a different type of valve.

SUMMARY OF THE INVENTION

It is a general object of the invention to provide an improved coupling apparatus for coupling a powered actuator to a valve, which avoids the disadvantages of prior coupling arrangements, while affording additional structural and operating advantages.

An important feature of the invention is the provision of a coupling apparatus of the type set forth, which permits free movement of the actuator into and out of engagement with the valve without the use of tools.

Another feature of the invention is to provide coupling apparatus of the type set forth, which is adaptable for use with different types of valve constructions.

Another feature of the invention is the provision of coupling apparatus of the type set forth, which is uniquely adapted for coupling to handwheel-operated valves.

A still further feature of the invention is the provision of a powered actuator incorporating a coupling apparatus of the type set forth.

These and other features of the invention are attained by providing: coupling apparatus for coupling a drive motor to a valve, wherein the motor has a housing and a rotary output shaft and the valve has a body with a rotary valve stem and a handwheel for operating the valve stem, the apparatus comprising: an anchor bracket having a mounting portion adapted to be fixedly secured to the motor housing and a generally C-shaped portion defining more than half of a loop and adapted to be freely fitted around a portion of the valve body in coupling relationship therewith substantially non-rotatable relative thereto about the axis of the valve stem, an actuation member adapted to be fixedly secured to the motor output shaft, and coupling mechanism carried by the actuator member and freely movable into driving engagement with the handwheel simultaneously with movement of the anchor bracket into coupling relationship with the valve body for effecting rotation of the handwheel in response to rotation of the motor output shaft, whereby the apparatus can be freely moved into and out of actuating engagement with the valve without the use of tools.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a side elevational view of a powered actuator in accordance with a first embodiment of the invention, shown coupled to an associated valve and illustrating two different positions of the valve;

FIG. 2 is a top plan view of the actuator of FIG. 1, taken along the line 2—2 therein;

FIG. 3 is an exploded perspective view of the coupling apparatus for the actuator of FIG. 1;

DESCRIPTION OF THE PREFERRED EMBODIMENTS

Figure 4:
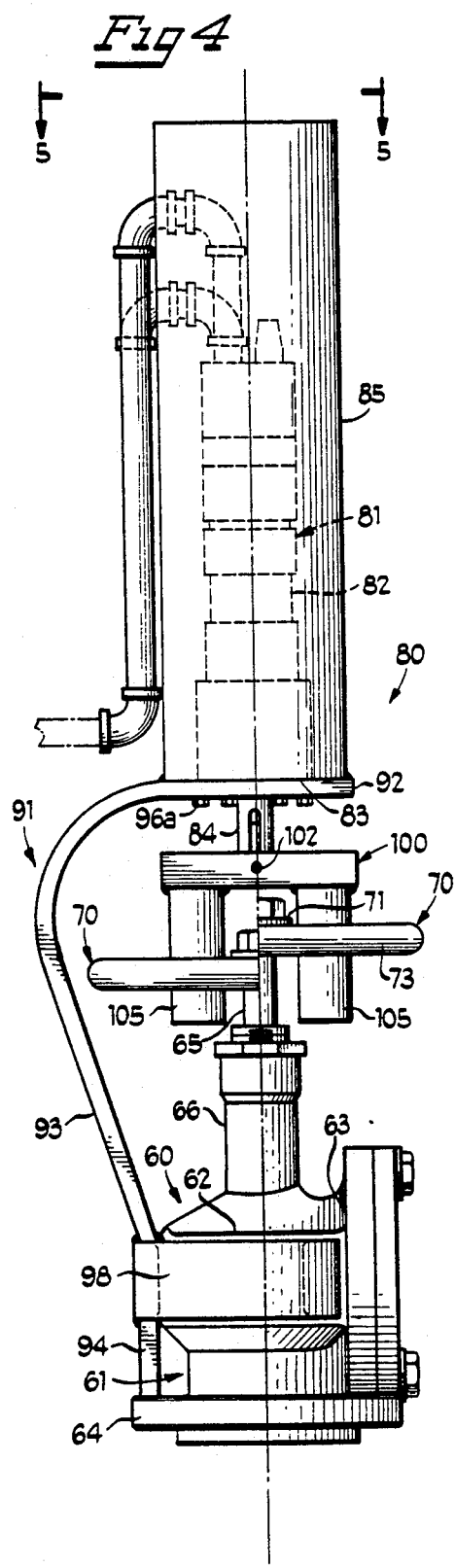
FIG. 4 is a view similar to FIG. 1 of another embodiment of the powered actuator in accordance with the present invention.

Referring to FIGS. 1-3, there is illustrated an angle valve 10, of the type used with chlorine cargo tanks. The valve 10 has a body 11 with a port 12 adapted to be coupled to an associated cargo vessel (not shown) in a known manner, and a port 14 adapted for coupling to another conduit (not shown). The valve 10 has an externally threaded stem 15 which projects from the upper end of the body 11 substantially coaxially with the port 12. The valve body 11 provides a yoke 16 which includes a cylindrical nut 17 threadedly engaged with the valve stem 15, and two diametrically opposed arcuate arms 18 which extend between the body 11 and the nut 17 for supporting the nut 17 a predetermined distance above the body 11. The valve 10 includes a solid handwheel 20 which includes a substantially circular disk 21 having a hub 22 centrally thereof fixed to the upper end of the stem 15 by suitable means. The disk 21 has an upstanding raised rim 23 integral therewith around the perimeter thereof and having a plurality of equiangularly spaced apart ribs 24 projecting radially outwardly therefrom. Formed on the inner surface of the raised rim 23 at equiangularly spaced-apart locations are a plurality of recesses 25, four such recesses being illustrated in FIG. 3. It will be appreciated that the handwheel 20 is used to rotate the stem 15, which travels axially by reason of its threaded engagement with the nut 17, for actuation of the valve 10 between its open and closed conditions, all in a known manner.

In order to effect remotely-controlled, powered rotation of the handwheel 20, there is provided a powered actuator assembly 30, which includes a rotary air motor 31, having a generally cylindrical housing 32 with an end face 33 from which there coaxially extends a rotatable output shaft 34. A part-cylindrical protective sleeve 35 may be provided around the motor housing 32 coaxially therewith. The air motor 31 is provided with air conduits 36 and 37 adapted for coupling to associated supplies of pressurized air for operation of the air motor 31. An exhaust port 38 is provided at the upper end of the housing 32. It will be appreciated that, in operation, the air motor 31 operates to rotate its output shaft 34 about its axis in either of two rotational directions relative to the housing 32, all in a known manner.

The actuator assembly 30 includes a coupling adapter 40 for coupling the air motor 31 to the valve 10. More specifically, the coupling adapter 40 includes an anchor bracket 41 for coupling the motor housing 32 to the valve body 11 and an actuator frame or coupler 50 for coupling the motor output shaft 34 to the handwheel 20. The anchor bracket 41 is in the form of a relatively wide metal plate bent into a generally U-shaped configuration, with the U disposed on its side. The bracket 41, in its use configuration, includes a upstanding vertical leg 42 integral at its opposite ends, respectively, with horizontally extending top and bottom flanges 43 and 44. The top flange 43 has a bore 45 therethrough for accommodating the motor output shaft 34 and a plurality of smaller holes 46 therethrough arranged in a circle around the outside of the bore 45 for accommodating associated bolts 47, securely to fasten the top flange 43 to the end face 33 of the air motor housing 32. In this regard, it will be appreciated that the lower end of the protective sleeve 35 is attached to the top flange 43 by suitable means, such as welding.

Fixedly secured, as by welding, to the bottom flange 44 at its distal end is a generally C-shaped collar 48, which is generally in the form of a metal rod, circular in transverse cross section, and bent in the shape of an elongated "C" disposed on its side. The collar 48 defines substantially more than half of a closed loop, with its distal ends 49 spaced-apart a distance substantially less than the maximum width of the valve yoke 16. The bottom flange 44 and the collar 48 are so dimensioned and arranged that the collar 48 is substantially coplanar with the bottom flange 44 and is disposed substantially coaxially with the bore 45 through the top flange 43. Thus, when the anchor bracket 41 is arranged with the C-shaped collar 48 disposed between the handwheel 20 and the yoke 16, with the top flange 43 disposed above the handwheel 20, and with the motor output shaft 34 substantially coaxial with the valve stem 15, the collar 48 will be disposed in vertical alignment with the yoke arms 18, so that when the actuator assembly 30 is lowered axially of the valve stem 15, the collar 48 will drop into encompassing relationship with the yoke arms 18, as can best be seen in FIG. 1.

The actuator frame or coupler 50 is generally cruciform in shape and includes a central bore 51 adapted to receive therethrough the lower end of the motor output shaft 34 for attachment thereto, as by a key and set screws 52. The actuator frame 50 has two opposed arms 53, respectively provided with circular holes 54 therethrough for respectively receiving the upper ends of depending tubular legs 55, which are fixed to the actuator frame 50 by suitable means. The actuator frame 50 also has opposed arms 56 aligned substantially perpendicular to the arms 53 and respectively provided with slots 57 which bifurcate their distal ends. pivot pins 58 respectively extend across the slots 57 for respectively pivotally mounting hooks 59. The parts are so dimensioned and arranged that the legs 55 are respectively receivable in engagement with two opposed ones of the handwheel recesses 25 for rotation of the handwheel 20 in response to rotation of the motor output shaft 34. When the legs 55 are disposed in engagement in the recesses 25, the hooks 59 are pivotally movable down around and beneath the raised rim 23 for securely retaining the actuator frame 50 in rotating engagement with the handwheel 20.

It is a significant aspect of the invention that the powered actuator assembly 30 can be moved into and out of driving engagement with the valve 10 without the use of tools. More specifically, in order to couple the powered actuator assembly 30 to the valve 10, the actuator assembly 30 is first positioned alongside the valve 10 with the C-shaped collar 48 disposed at a level between the handwheel 20 and the yoke 16. The anchor bracket 41 is so dimensioned that, in this position, the actuator frame 50 will be disposed above the level of the handwheel 20. The actuator assembly 30 is then moved horizontally toward the valve 10 to bring the motor output shaft 34 substantially into coaxial alignment with the valve stem 15, whereupon the actuator assembly 30 is lowered axially of the stem 15 into coupling engagement with the valve 10.

More specifically, the actuator frame legs 55 are lowered into engagement in associated ones of the handwheel recesses 25, the parts being dimensioned so that when thus engaged, the C-shaped collar 48 will be disposed in encompassing relationship with the yoke arms 18. It may be necessary to rotate the motor output shaft 34 slightly to align the legs 55 with the handwheel recesses 25. The hooks 59 are then lowered into retaining engagement with the handwheel 20. It will be appreciated that the anchor bracket 41 is so dimensioned and arranged that, when the parts are in this configuration, the vertical leg 42 of the anchor bracket 41 clears the handwheel 20, and the actuator assembly 30 is supported on the handwheel 20. When the air motor 31 is actuated it will, therefore, rotate the handwheel 20 with the C-shaped collar 48 engaging the yoke arms 18 to prevent substantial rotation of the air motor housing 32 relative to the valve body 10. Since the actuator assembly 30 is supported on the handwheel 20, it will move vertically with the handwheel 20 as the valve 10 is moved between its open and closed conditions, as is illustrated in FIG. 1, but the axial travel of the valve stem 15 between the open and closed conditions is sufficiently small that the C-shaped collar 48 remains disposed for retaining engagement with the yoke arms 18.

In order to disengage the actuator assembly 30 from the valve 10, it is necessary only to pivot the hooks 59 upwardly out of engagement with the handwheel 20 and then lift the entire actuator assembly 30 until the legs 55 are disengaged from the handwheel 20 and the collar 48 is disengaged from the yoke 16, and then move the actuator assembly 30 laterally away from the valve 10. It will be appreciated that these simple engaging and disengaging movements can be effected quickly and easily without the use of tools.

Figure 5:
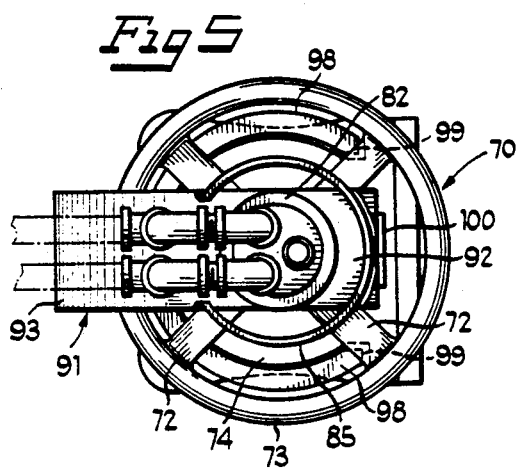
FIG. 5 is a top plan view of the actuator of FIG. 4, taken along the line 5—5 therein.
Figure 6:
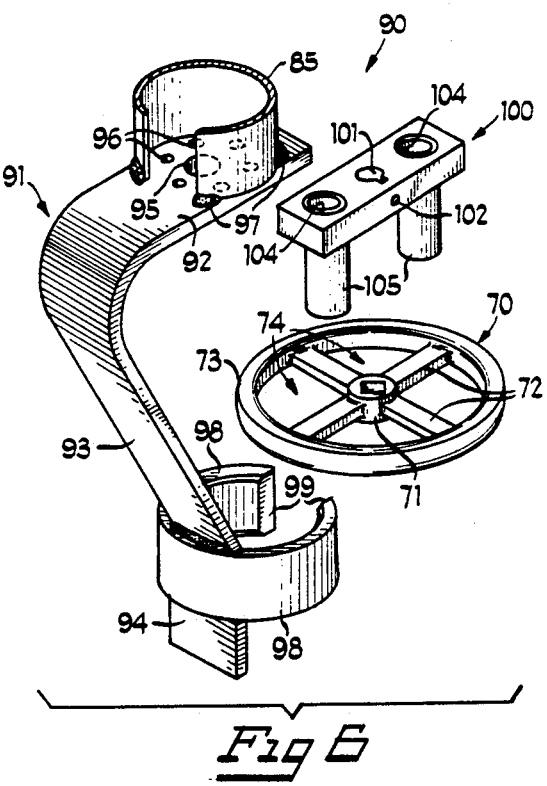
FIG. 6 is an exploded perspective view of the coupling apparatus of the actuator of FIG. 4.

Referring now to FIGS. 4-6, there is illustrated an alternative embodiment of the invention for use with a valve 60, which is an angle valve of slightly different construction from the valve 10. More specifically, the valve 60 has a body 61 with a part-cylindrical portion 62 which is coaxial with a port disposed for communication with the associated vessel and a non-cylindrical portion 63, integral with the part-cylindrical portion 62 and defining another port. The valve body 61 has a laterally outwardly extending flange 64 at its lower end and is provided with a valve stem 65 which is threadedly engaged in a tubular neck 66 projecting from the upper end of the valve body 61 substantially coaxial with the part-cylindrical portion 62. The valve 60 is provided with an operating handwheel 70 which has a central hub 71 fixedly secured to the valve stem 65 at its upper end. A plurality of equiangularly spaced-apart spokes 72 interconnect the hub 71 and a peripheral rim 73, the spokes 72 cooperating to define slots 74 therebetween. The valve 60 operates in substantially the same manner as the valve 10 described above.

For remotely-controlled power operation of the valve 60, there is provided a powered actuator assembly 80, in accordance with another embodiment of the invention. The actuator assembly 80 includes an air motor 81 having a generally cylindrical housing 82, provided at one end with an end face 83 from which coaxially projects a rotatable output shaft 84. The air motor 81 is provided with air inlet and exhaust conduits in substantially the same manner as was described above in connection with the air motor 31, and operates in the same manner. The air motor 81 may be provided with a part-cylindrical protective sleeve 85 disposed in substantially surrounding coaxial relationship with the housing 82.

The actuator assembly 80 includes a coupling adapter 90 for coupling the air motor 81 to the valve 60. More specifically, the coupling adapter 90 includes an anchor bracket 91 for coupling the air motor housing 82 to the valve body 61, and an actuator bar or coupler 100 for coupling the motor output shaft 84 to the handwheel 70. The anchor bracket 91 is a relatively wide, elongated metal plate bent to define a top flange 92 disposed substantially horizontally in use, and a depending side arm 93 disposed at an acute angle relative to the top flange 92, and a depending foot 94 disposed substantially perpendicular to the top flange 92. A circular bore 95 is formed through the top flange 92 for accommodating the motor output shaft 84, and a plurality of smaller holes 96 are arranged in a circle about the bore 95 for respectively receiving associated bolts 96a, fixedly to secure the top flange 92 to the end face 83 of the air motor housing 82. The lower end of the protective sleeve 85 may be fixedly secured to the top flange 92, as by weldments 97.

Fixedly secured, as by welding, to the lower end of the side arm 93 is a part-cylindrical collar 98 which defines substantially more than half of a closed loop and is dimensioned to encompass the part-cylindrical portion 62 of the valve body 61. The collar 98 has free ends 99, diametrically opposite the depending side arm 93, which are spaced apart a distance slightly greater than the width of the non-cylindrical portion 63 of the valve body 61 at its junction with the part-cylindrical portion 62, but substantially less than the diameter of the part-cylindrical portion 62. Thus, it will be appreciated that the collar 98 can be lowered axially of the part-cylindrical portion 62 into encompassing relationship therewith, and engagement of the arm ends 99 with the non-cylindrical portion 63 will effectively prevent substantial rotation of the anchor bracket 91 relative to the axis of the valve stem 65. A foot 94 is secured to the lower edge of the collar 98 in alignment with the depending side arm 93 and is dimensioned to engage the valve flange 64 when the collar 98 is lowered over the part-cylindrical portion 62.

The actuator bar or coupler 100 is in the form of a rectangular bar having a central bore 101 therethrough adapted for receiving therein the distal end of the motor output shaft 84 for fixed attachment thereto, as by a key and a set screw 102. Holes 104 are respectively formed through the bar 100 adjacent to its distal ends, for respectively receiving the upper ends of depending tubular legs 105, which are fixed thereto by suitable means. The legs 105 are dimensioned to fit in opposed ones of the slots 74 between the spokes 72 of the handwheel 70.

In use, when it is desired to move the actuator assembly 80 into engagement with the valve 60, it is first positioned alongside the valve 60, with the collar 98 positioned at a level below the handwheel 70 and above the part-cylindrical portion 62 of the valve body 61. The anchor bracket 91 is so dimensioned that, when the actuator assembly is so positioned, the lower ends of the legs 105 of the actuator bar 100 will be disposed above the level of the handwheel 70. The actuator assembly 80 is then moved laterally to bring the motor output shaft 84 substantially into coaxial alignment with the valve stem 65, and the actuator assembly 80 is then lowered axially of the valve stem 65 into engagement with the valve 60. More specifically, the collar 98 is lowered into coaxial encompassing relationship with the part-cylindrical portion of the valve body 61, as described above, until the lower end of the foot 94 engages the valve flange 64, as illustrated in FIG. 4. Thus, it will be appreciated that the actuator assembly 80 is supported on the flange 64. This lowering movement will also lower the actuator legs 105 through the handwheel slots 74 for coupling engagement with the handwheel 70. It may be necessary to slightly rotate the motor output shaft 84 to bring the legs 105 into proper alignment with the slots 74.

When the air motor 81 is operated, it will rotate the handwheel 70 for operating the valve 60 between its open and closed conditions, the engagement of the collar ends 99 with the non-cylindrical portion 63 of the valve body 61 preventing substantially rotation of the air motor housing 82. Since the actuator assembly 80 is supported on the valve body 61, the handwheel 70 will move axially relative to the actuator legs 105 as the valve 60 is moved between its open and closed conditions, as is illustrated in FIG. 4. The actuator assembly 80 may be disengaged by raising it and then moving it laterally, in the same manner as was described above in connection with the actuator assembly 30. It will be appreciated that the actuator assembly can thus be moved into and out of coupling engagement with the valve 60 completely without the use of tools and, if desired, completely by remote control.

From the foregoing, it can be seen that there has been provided an improved powered actuator assembly which includes a coupling arrangement for permitting the actuator assembly to be moved in and out of coupling engagement with an associated valve without the use of tools, the assembly being provided with alternative coupling arrangements for use with different valve constructions.

We claim:

1. Coupling apparatus for coupling a drive motor to a valve, wherein the motor has a housing and a rotary output shaft and the valve has a body with a rotary valve stem and a handwheel for operating the valve stem, said apparatus comprising: an anchor bracket having a mounting portion adapted to be fixedly secured to the motor housing and a generally C-shaped portion defining more than half of a loop and adapted to be freely fitted around a portion of the valve body in coupling relationship therewith substantially non-rotatable relative thereto about the axis of the valve stem, an actuation member adapted to be fixedly secured to the motor output shaft, and coupling mechanism carried by said actuator member and freely movable into driving engagement with the handwheel simultaneously with movement of said anchor bracket into coupling relationship with the valve body for effecting rotation of the handwheel in response to rotation of the motor output shaft, whereby said apparatus can be freely moved into and out of actuating engagement with the valve without the use of tools.

2. The apparatus of claim 1, wherein said coupling mechanism includes means disposable in supported engagement with the handwheel for support thereby and movement therewith axially of the valve stem.

3. The apparatus of claim 2, wherein the handwheel is solid and includes coupling recesses in the upper surface thereof, said coupling mechanism including legs engageable in said recesses.

4. The apparatus of claim 2, wherein said coupling mechanism further includes hook means engageable with said handwheel for preventing substantial movement of said actuator member relative to the handwheel in a direction axially of the valve stem.

5. The apparatus of claim 1, wherein said bracket includes means disposable in supported engagement with the valve body for support of said coupling apparatus thereon.

6. The apparatus of claim 5, wherein the handwheel is spoked, said coupling mechanism including legs axially movable between the spokes of the handwheel for rotating engagement therewith.

7. The apparatus of claim 1, wherein said bracket is arcuate in shape with said mounting portion adjacent to one end thereof and said C-shaped portion adjacent to the other end thereof, said bracket being shaped and dimensioned so that when said apparatus is disposed in actuating engagement with the valve the arc of said bracket extends laterally of the valve and clears the handwheel.

8. The apparatus of claim 1, wherein said air motor housing has an end face, said bracket being in the form of an elongated metal strap, said mounting portion of said strap comprising a flat plate having a width at least as great as that of the end face of the motor housing for attachment thereto in face-to-face abutting relationship therewith, said mounting portion having an aperture therethrough for accommodating the motor output shaft.

9. Actuator apparatus for a valve which includes a body and a rotary valve stem projecting from the body and a solid handwheel having a plurality of spaced-apart recesses in its upper surface and coaxially connected to the valve stem for rotation thereof and a yoke including a nut threadedly engaged with a valve stem and a pair of arms extending laterally outwardly and downwardly from the nut to the valve body, said apparatus comprising: a drive motor including a housing and a rotary output shaft, an elongated bracket fixedly secured to the motor housing and projecting therefrom to a distal end, said bracket having a generally C-shaped portion at its distal end substantially coaxial with the motor output shaft and defining more than half of a loop, said C-shaped portion being shaped and dimensioned to be freely movable in a direction axially of the valve stem into coupling relationship with the valve body wherein said C-shaped portion encompasses the yoke arms so as to be substantially non-rotatable relative thereto about the axis of the valve stem, an actuator member fixedly secured to the motor output shaft for rotation therewith, and coupling legs depending from said actuator member and dimensioned and arranged for coupling engagement in the recesses of the handwheel for rotation thereof in response to rotation of the motor output shaft, said actuator member being spaced from said C-shaped portion of said bracket a distance such that said coupling legs are freely movable into coupling engagement in the handwheel recesses in a direction axially of the valve stem simultaneously with movement of said C-shaped portion into coupling relationship with the yoke arms, whereby said apparatus can be freely moved into and out of actuating engagement with the valve without the use of tools.

10. The apparatus of claim 9, said bracket has a mounting arm for attachment to the motor housing, said bracket being shaped and dimensioned so that when said apparatus is disposed in actuating engagement with the valve the arc of said bracket extends laterally of the valve and clears the handwheel.

11. The apparatus of claim 10, wherein said C-shaped portion lies in a plane substantially perpendicular to the axis of the motor output shaft and is substantially coaxial therewith.

12. The apparatus of claim 9, and further comprising hook means carried by said actuator member and adapted for engagement with the handwheel for preventing substantial movement of said actuator apparatus relative to the handwheel in a direction axially of the valve stem.

13. The apparatus of claim 12, and further comprising means on said actuator member pivotally mounting said hook means for movement between engaged and disengaged positions relative to the handwheel.

14. The apparatus of claim 12, wherein said actuator member is generally cruciform in shape and includes four arms, two of said coupling legs respectively depending from two opposed ones of said arms and two of said hook means respectively depending from the other two of said arms.

15. Actuator apparatus for a valve which has a body with a part-cylindrical portion and a non-cylindrical portion and a rotary valve stem projecting from the body and a spoked handwheel connected to the valve stem for rotation thereof, said apparatus comprising: a drive motor including a housing and a rotary output shaft, an elongated bracket fixedly secured to the motor housing and projecting therefrom to a distal end, said bracket having a generally C-shaped portion adjacent to its distal end substantially coaxial with the motor output shaft and defining more than half of a loop, said C-shaped portion being shaped and dimensioned to be freely movable in a direction axially of the valve stem into coupling relationship with the valve body wherein said C-shaped portion encompasses the part-cylindrical portion of the valve body for engagement with the non-cylindrical portion thereof so as to be substantially non-rotatable relative thereto about the axis of the valve stem, said bracket including a support portion disposed for supported engagement with the valve body when said C-shaped portion is disposed in coupling relationship therewith for supporting said bracket thereon, an actuator member fixedly secured to the motor output shaft for rotation therewith, and coupling legs depending from said actuator member and dimensioned and arranged for insertion between the spokes of the handwheel for engagement therewith for rotation thereof in response to rotation of the motor output shaft, said actuator member being spaced from said C-shaped portion of said bracket a distance such that said coupling legs are freely movable into coupling engagement between the spokes of the handwheel in a direction axially of the valve stem simultaneously with movement of said C-shaped portion into coupling relationship with the valve body, whereby said apparatus can be freely moved into and out of actuating engagement with the valve without the use of tools.

16. The apparatus of claim 15, wherein said bracket is shaped and dimensioned so that when said apparatus is disposed in actuating engagement with the valve said bracket extends laterally of the valve and clears the handwheel.

17. The apparatus of claim 16, wherein the valve body has a laterally outwardly extending flange, said support portion of said bracket comprising a foot at the distal end thereof disposed for engagement with the valve body flange.

18. The apparatus of claim 15, wherein said C-shaped portion is in the form of a relatively wide metal band.

19. The apparatus of claim 15, wherein said actuator member is a bar connected intermediate its ends to the motor output shaft and extending substantially perpendicular thereto, said apparatus including two of said coupling legs respectively disposed adjacent to opposite ends of said actuator member for engagement with the handwheel at diametrically opposed locations thereon.

20. The apparatus of claim 15, wherein said C-shaped portion has ends spaced apart a distance less than the diameter of the part-cylindrical portion of the valve body and greater than the width of the non-cylindrical portion of the valve body.

* * * * *